(12) United States Patent
Hu

(10) Patent No.: US 12,183,962 B2
(45) Date of Patent: Dec. 31, 2024

(54) TERMINATED SPREAD-SPECTRUM WAVEGUIDE-TO-COAXIAL CONVERTER

(71) Applicant: Nan Hu, Irvince, CA (US)

(72) Inventor: Nan Hu, Irvince, CA (US)

(73) Assignee: Nan Hu

( * ) Notice: Subject to any disclaimer, the term of this patent is extended or adjusted under 35 U.S.C. 154(b) by 0 days.

(21) Appl. No.: 18/528,836

(22) Filed: Dec. 5, 2023

(65) Prior Publication Data

US 2024/0162593 A1     May 16, 2024

Related U.S. Application Data

(63) Continuation of application No. PCT/CN2022/136650, filed on Dec. 5, 2022.

(30) Foreign Application Priority Data

Mar. 21, 2022   (CN) .......................... 202210278239.X

(51) Int. Cl.
*H01P 5/08*   (2006.01)
*H01P 3/06*   (2006.01)
*H01P 3/12*   (2006.01)

(52) U.S. Cl.
CPC ................. *H01P 5/08* (2013.01); *H01P 3/06* (2013.01); *H01P 3/12* (2013.01)

(58) Field of Classification Search
CPC ...... H01P 5/08; H01P 3/06; H01P 3/12; H01P 5/082; Y02D 30/70
See application file for complete search history.

(56) References Cited

U.S. PATENT DOCUMENTS

2022/0037756 A1*   2/2022   Skowyra ................. H01P 5/103

FOREIGN PATENT DOCUMENTS

| CN | 204834817 U | | 12/2015 | |
|----|----|----|----|----|
| CN | 106553213 A | | 3/2017 | |
| CN | 110739515 A | * | 1/2020 | .............. H01P 5/103 |
| CN | 210778917 U | | 6/2020 | |
| CN | 113346214 A | * | 9/2021 | |
| CN | 214706202 U | | 11/2021 | |
| CN | 114552156 A | | 5/2022 | |
| CN | 216872231 U | | 7/2022 | |
| JP | S6284205 U | * | 5/1987 | |
| JP | 2002217617 A | | 8/2002 | |

* cited by examiner

*Primary Examiner* — Andrea Lindgren Baltzell
*Assistant Examiner* — Kimberly E Glenn
(74) *Attorney, Agent, or Firm* — Samson G. Yu

(57) ABSTRACT

Disclosed is a terminated spread-spectrum waveguide-to-coaxial converter, which relates to the technical field of waveguide converters. The converter includes an upper cavity, a lower cavity, a cover plate and a connector, where a waveguide cavity is formed between the upper cavity and the lower cavity, openings are formed on a left side and a right side of the waveguide cavity, the cover plate is fixed to an outer side of a left end opening of the waveguide cavity, the connector is fixed to an outer side of the cover plate, and a coaxial inner conductor on the connector passes through a through hole formed on the cover plate to enter the waveguide cavity.

8 Claims, 9 Drawing Sheets

TERMINATED SPREAD-SPECTRUM WAVEGUIDE-TO-COAXIAL CONVERTER

CROSS-REFERENCE TO RELATED APPLICATION

The disclosure claims the benefit of priority to Chinese Patent Application No. 202210278239.X, filed with the Chinese Patent Office on Mar. 21, 2022 and entitled "Terminated spread-spectrum waveguide-to-coaxial converter".

TECHNICAL FIELD

The disclosure relates to the technical field of waveguide converters, and particularly to a terminated spread-spectrum waveguide-to-coaxial converter having excellent spread-spectrum performance.

BACKGROUND

Waveguide-to-coaxial converter functions as an essential component in the field of microwaves for transition between coaxial signals and waveguide signals. A coaxial inner conductor (i.e. a connector extending into a waveguide cavity) can be regarded as a probe in a waveguide, and energy exchange between the probe and the waveguide is in essence an excitation process of the probe in the waveguide. In the waveguide, discontinuity will be generated by insertion of the probe, causing an infinite number of high-order modes. However, merely fundamental modes are transmitted in the waveguide, and the high-order modes that cannot be transmitted will gather around the probe to produce a reactive effect, resulting in inferior spread-spectrum performance.

SUMMARY

The technical problem to be solved by some embodiments of the disclosure is to provide a terminated spread-spectrum waveguide-to-coaxial converter having excellent spread-spectrum performance and a wide operation bandwidth.

In order to solve the above technical problem, the disclosure employs a technical solution as follows: a terminated spread-spectrum waveguide-to-coaxial converter includes an upper cavity, a lower cavity, a cover plate and a connector, where a waveguide cavity is formed between the upper cavity and the lower cavity, openings are formed on a left side and a right side of the waveguide cavity, the cover plate is fixed to an outer side of a left end opening of the waveguide cavity, the connector is fixed to an outer side of the cover plate, and a coaxial inner conductor on the connector passes through a through hole formed on the cover plate to enter the waveguide cavity.

A further technical solution is as follows: a boss structure which is continuous formed on a left side of an inner surface of the lower cavity, a sleeve is arranged at an end of the boss structure corresponding to the coaxial inner conductor, and an end of the coaxial inner conductor inserts into the sleeve.

A further technical solution is as follows: the boss structure includes a first boss, a second boss and a third boss that are continuous and gradually rise from right to left in sequence, the sleeve is located on a left side face of the third boss, a groove is formed at a joint between the sleeve and the third boss, and the end of the coaxial inner conductor inserts into the sleeve, extends into the groove, and keeps a distance from a bottom of the groove.

A further technical solution is as follows: a slope extending upwards is formed from a middle of a lower surface of the upper cavity to a right end opening of the waveguide cavity, and a slope extending downwards is formed from a middle of an upper surface of the lower cavity to the right end opening of the waveguide cavity.

A further technical solution is as follows: an upper flange connecting portion is formed on a right side of the upper cavity, a lower flange connecting portion is formed on a right side of the lower cavity, the upper flange connecting portion and the lower flange connecting portion form a flange connecting portion, and a connecting hole is formed on the flange connecting portion.

Preferably, the upper cavity and the lower cavity are fixedly connected to each other by means of a screw and a screw hole that match each other, the cover plate is fixed to left ends of the upper cavity and the lower cavity by screws, and the connector is fixed to the cover plate by a screw.

The above technical solutions have beneficial effects as follows: according to the converter in the disclosure, impedance matching is implemented by a step structure, an operation bandwidth is expanded, and the step structure is easy to debug and simple to machine, with machining difficulty reduced. Moreover, a narrow b-edge structure (a shorter side of a rectangular waveguide is called a side b) is used at a joint between a waveguide and a coaxial structure (the narrow b-edge structure is realized by arranging slopes on an upper surface and a lower surface in a cavity) to further expand a high frequency bandwidth, such that easy machinability of the structure is ensured while an operation bandwidth is effectively widened.

In addition, since a cut-off frequency (a low frequency) of a fundamental mode of the rectangular waveguide is mainly affected by a size of a longer side, that is, the side a of the rectangular waveguide, reduction of a size of the side b has little effect on the cut-off frequency of the fundamental mode of the waveguide. Moreover, the narrow b-edge structure is able to reduce a size of an aperture of the rectangular waveguide, change a length-width ratio of a rectangle, and improve a cut-off frequency (a high frequency) of a high-order mode to a certain extent, so as to expand a bandwidth.

BRIEF DESCRIPTION OF THE DRAWINGS

The disclosure is further described in detail below in combination with accompanying drawings and particular embodiments.

Figure 1:
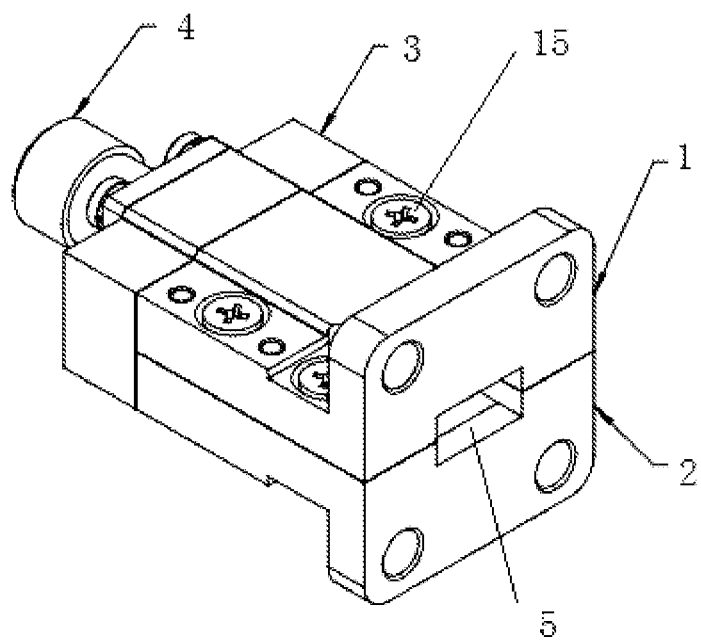
FIG. 1 is a solid schematic structural diagram of a converter according to an embodiment of the disclosure.
Figure 2:
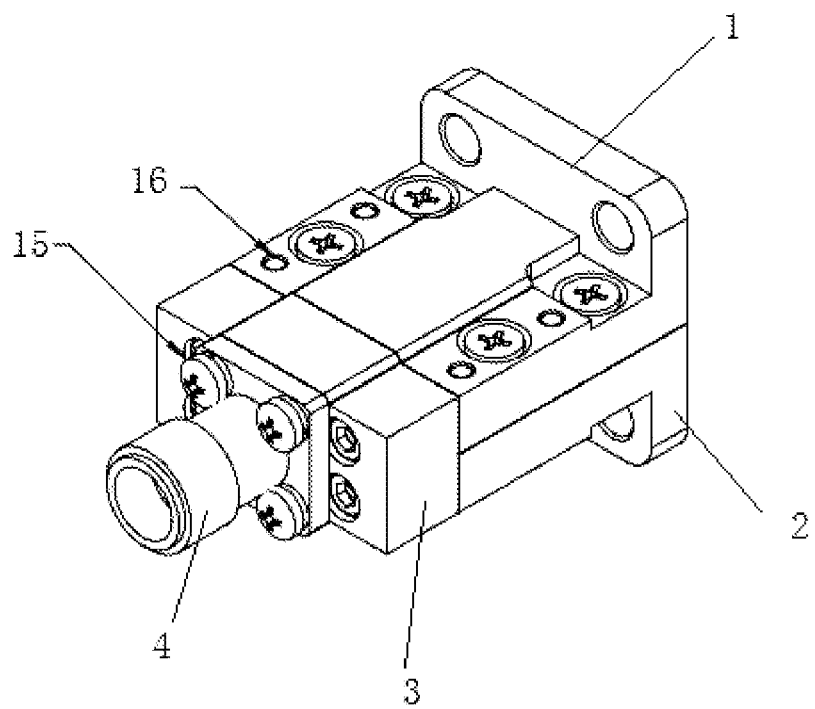
FIG. 2 is a solid schematic structural diagram of a converter according to an embodiment of the disclosure.
Figure 3:
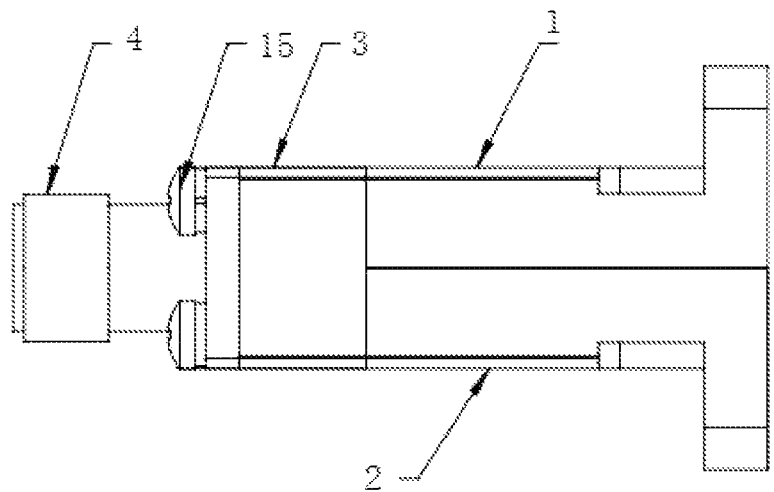
FIG. 3 is a schematic structural diagram of a front view of a converter according to an embodiment of the disclosure.
Figure 4:
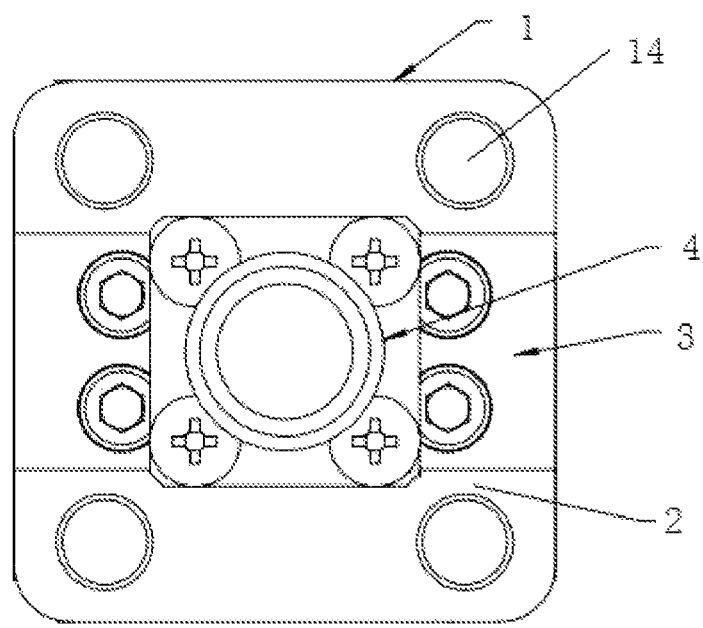
FIG. 4 is a schematic structural diagram of a left view of a converter according to an embodiment of the disclosure.
Figure 5:
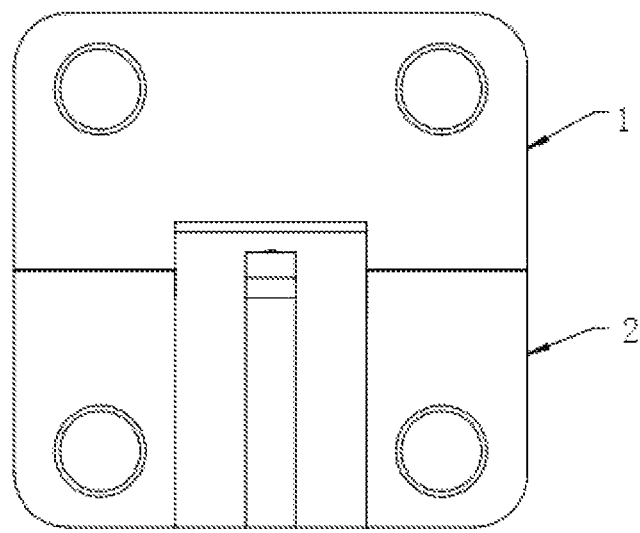
FIG. 5 is a schematic structural diagram of a right view of a converter according to an embodiment of the disclosure.

In figures: 1. upper cavity, 2. lower cavity, 3. cover plate, 4. connector, 5. waveguide cavity, 6. coaxial inner conductor, 7. sleeve, 8. first boss, 9. second boss, 10. third boss, 11. groove, 12. upper flange connecting portion, 13. lower flange connecting portion, 14. connecting hole, 15. screw, and 16. positioning pin.

DETAILED DESCRIPTION OF THE EMBODIMENTS

Technical solutions in examples of the disclosure will be clearly and completely described below in combination with accompanying drawings in the examples of the disclosure. Apparently, the described examples are merely some examples rather than all examples of the disclosure. On the basis of examples of the disclosure, all other examples derived by those of ordinary skill in the art without making creative efforts fall within the scope of protection of the disclosure.

Many specific details are set forth in the following description to facilitate full understanding of the disclosure, but the disclosure may also be implemented in other ways different from those described herein, similar derivatives can be made by those skilled in the art without departing from the connotation of the disclosure, and therefore the disclosure is not limited by particular examples disclosed below.

As shown in FIGS. 1-11, an example of the disclosure discloses a terminated spread-spectrum waveguide-to-coaxial converter. The converter includes an upper cavity 1, a lower cavity 2, a cover plate 3 and a connector 4, and the upper cavity 1, the lower cavity 2, the cover plate 3 and the connector 4 are made of metal materials. In an assembly process, the upper cavity 1 and the lower cavity 2 are fixedly connected to each other first by a screw 15 and a screw hole that match each other, the cover plate 3 is fixed to left ends of the upper cavity 1 and the lower cavity 2 by screws, and then the connector 4 is fixed to the cover plate by a screw. In addition, a positioning pin 16 and a positioning hole are formed on the upper cavity 1 and the lower cavity 2 respectively, and the upper cavity and the lower cavity may be quickly connected to each other by the positioning pin 16 and the positioning hole.

Figure 6:
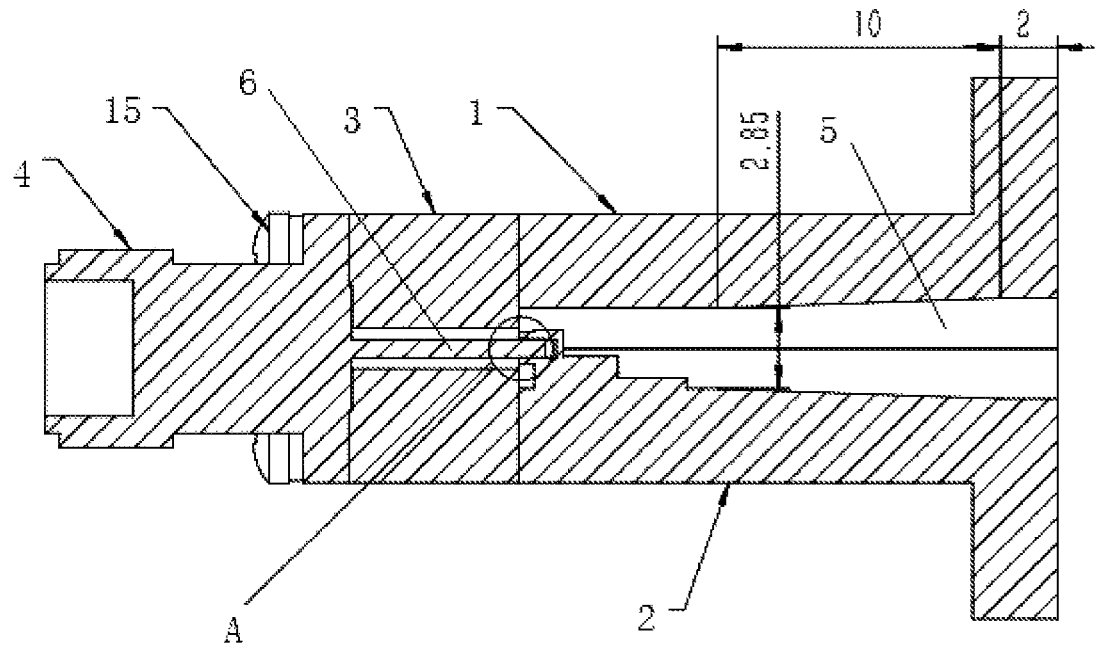
FIG. 6 is a schematic structural diagram of a section view of a converter according to an embodiment of the disclosure.
Figure 7:
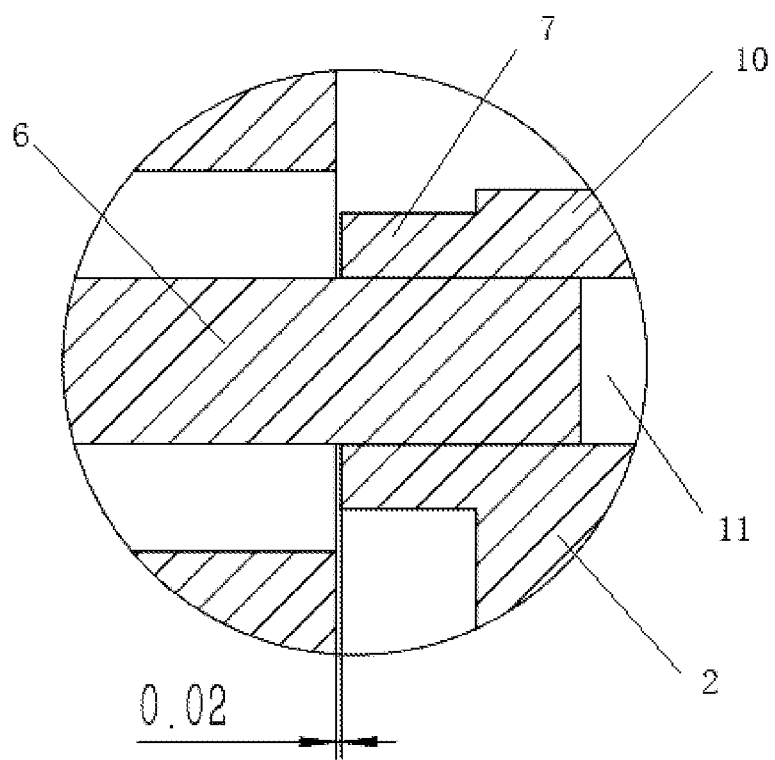
FIG. 7 is an enlarged structural schematic diagram of a position A in FIG. 6.
Figure 8:
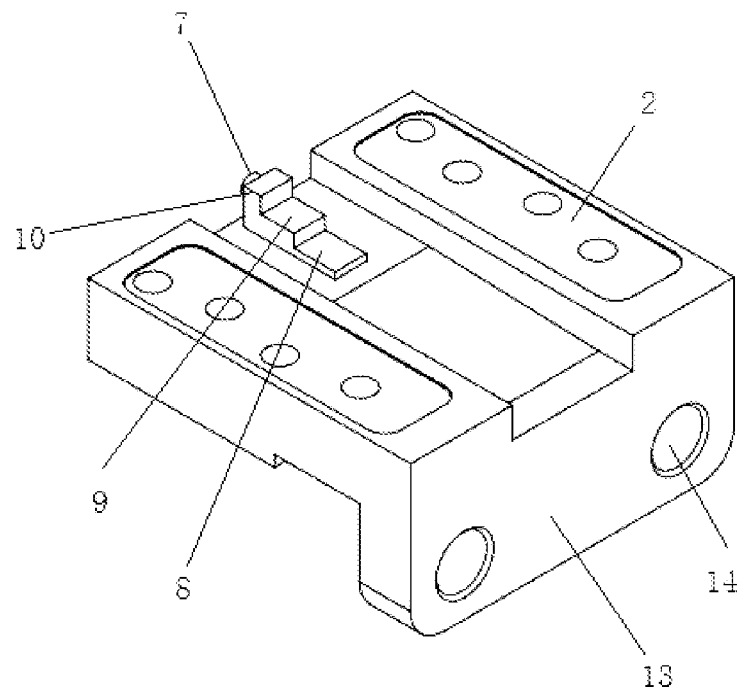
FIGS. 8 and 9 are solid schematic structural diagrams of a lower cavity according to an embodiment of the disclosure.
Figure 9:
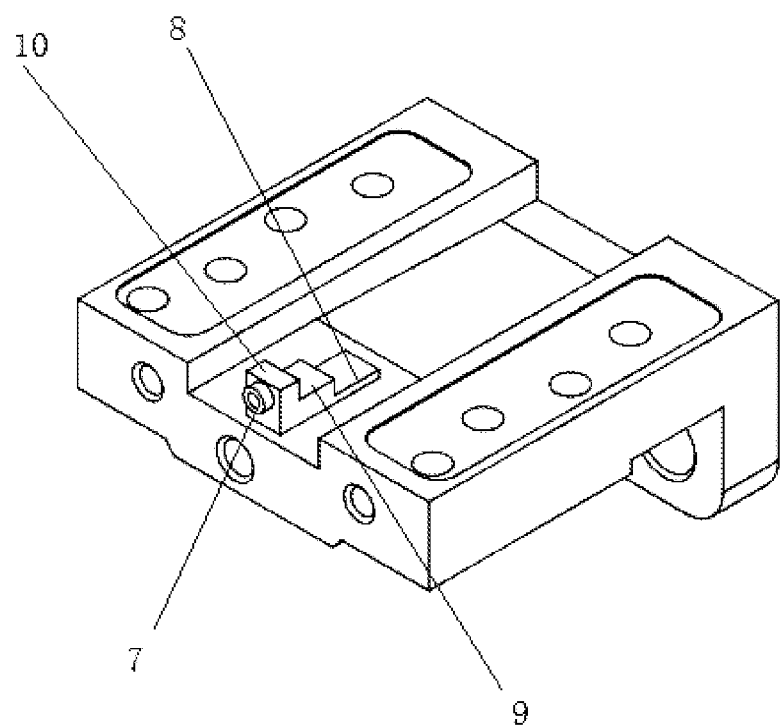
Figure 10:
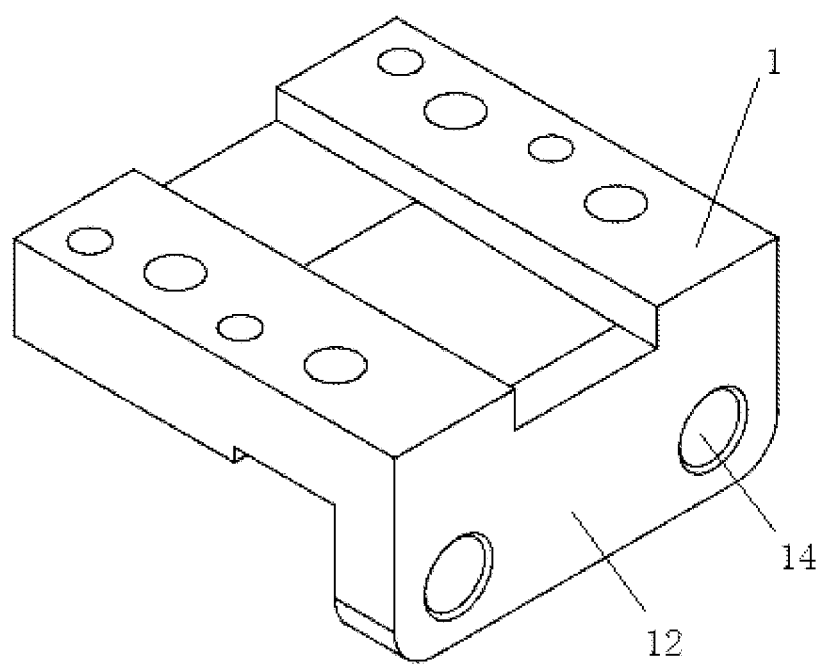
FIGS. 10 and 11 are solid schematic structural diagrams of an upper cavity according to an embodiment of the disclosure.
Figure 11:
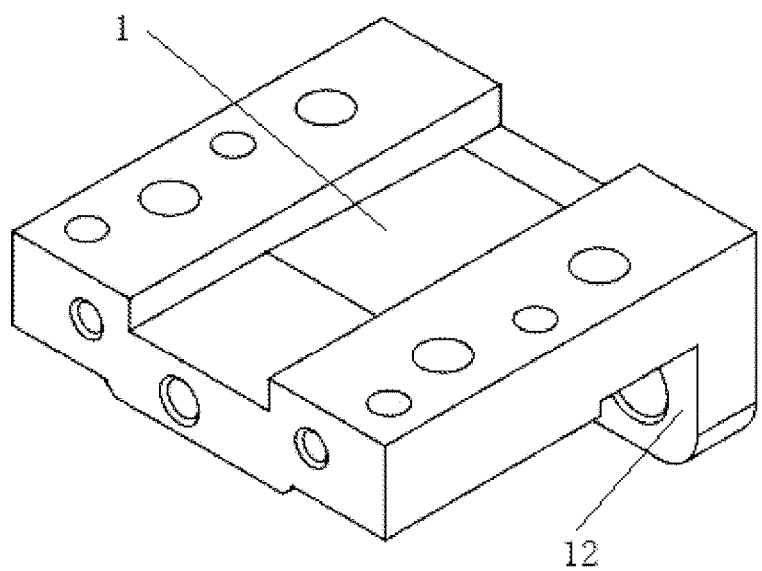

As shown in FIGS. 6 and 7, a waveguide cavity 5 is formed between the upper cavity 1 and the lower cavity 2, openings are formed on a left side and a right side of the waveguide cavity 5, the cover plate 3 is fixed to an outer side of a left end opening of the waveguide cavity 5, the connector 4 is fixed to an outer side of the cover plate 3, and a coaxial inner conductor 6 on the connector 4 passes through a through hole formed on the cover plate 3 to enter the waveguide cavity 5.

As shown in FIGS. 6-9, a boss structure which is continuous is formed on a left side of an inner surface of the lower cavity 2, a sleeve 7 is arranged at an end of the boss structure corresponding to the coaxial inner conductor 6, and an end of the coaxial inner conductor 6 inserts into the sleeve 7.

In some embodiments, as shown in FIGS. 6-9, the boss structure includes a first boss 8, a second boss 9 and a third boss 10 that are continuous and gradually rise from right to left in sequence, the sleeve 7 is located on a left side face of the third boss 10, a groove 11 is formed at a joint between the sleeve 7 and the third boss 10, and the end of the coaxial inner conductor 6 inserts into the sleeve 7, extends into the groove 11, and keeps a distance from a bottom of the groove 11. Further, as shown in FIG. 6, an upper surface of the third boss 10 keeps a distance from a lower surface of the upper cavity 1. In some embodiments, the distance described above is 2.85 mm. Further, as shown in FIG. 6, a gap is formed between the coaxial inner conductor 6 and the through hole of the cover plate 3.

According to the converter in the disclosure, impedance matching is implemented by a step structure, an operation bandwidth is expanded, and the step structure is easy to debug and simple to machine, with machining difficulty reduced. Moreover, a narrow b-edge structure (a shorter side of a rectangular waveguide is called a side b) is used at a joint between a waveguide and a coaxial structure (the narrow b-edge structure is realized by arranging slopes on an upper surface and a lower surface in a cavity) to further expand a high frequency bandwidth, such that easy machinability of the structure is ensured while an operation bandwidth is effectively widened.

In addition, since a cut-off frequency (a low frequency) of a fundamental mode of the rectangular waveguide is mainly affected by a size of a longer side, that is, the side a of the rectangular waveguide, reduction of a size of the side b (the shorter side of the rectangular waveguide) has little effect on the cut-off frequency of the fundamental mode of the waveguide. Moreover, the narrow b-edge structure is able to reduce a size of an aperture of the rectangular waveguide, change a length-width ratio of a rectangle, and improve a cut-off frequency (a high frequency) of a high-order mode to a certain extent, so as to expand a bandwidth.

Further, as shown in FIG. 6, a distance between the upper cavity 1 and the lower cavity 2 is gradually increased from left to right. A slope extending upwards is formed from a middle of a lower surface of the upper cavity 1 to a right end opening of the waveguide cavity 5, and a slope extending downwards is formed from a middle of an upper surface of the lower cavity 2 to the right end opening of the waveguide cavity 5. Through the above setting, the narrow b-edge structure (the shorter side of the rectangular waveguide is called the side b) is used at the joint between the waveguide and the coaxial structure (the narrow b-edge structure is realized by arranging slopes on the upper surface and the lower surface in the cavity) to further expand the high frequency bandwidth. Moreover, the narrow b-edge structure is able to reduce the size of the aperture of the rectangular waveguide, change the length-width ratio of the rectangle, and improve the cut-off frequency (the high frequency) of the high-order mode to the certain extent, so as to expand the bandwidth. The high frequency bandwidth is further expanded, and easy machinability of the structure is ensured while the operation bandwidth is effectively widened.

In addition, as shown in FIGS. 6-11, an upper flange connecting portion 12 is formed on a right side of the upper cavity 1, a lower flange connecting portion 13 is formed on a right side of the lower cavity 2, the upper flange connecting portion 12 and the lower flange connecting portion 13 form a flange connecting portion, and a connecting hole 14 is formed on the flange connecting portion. By the flange connecting portion, the converter may be connected to other components, and therefore is more convenient to fix.

Figure 12:
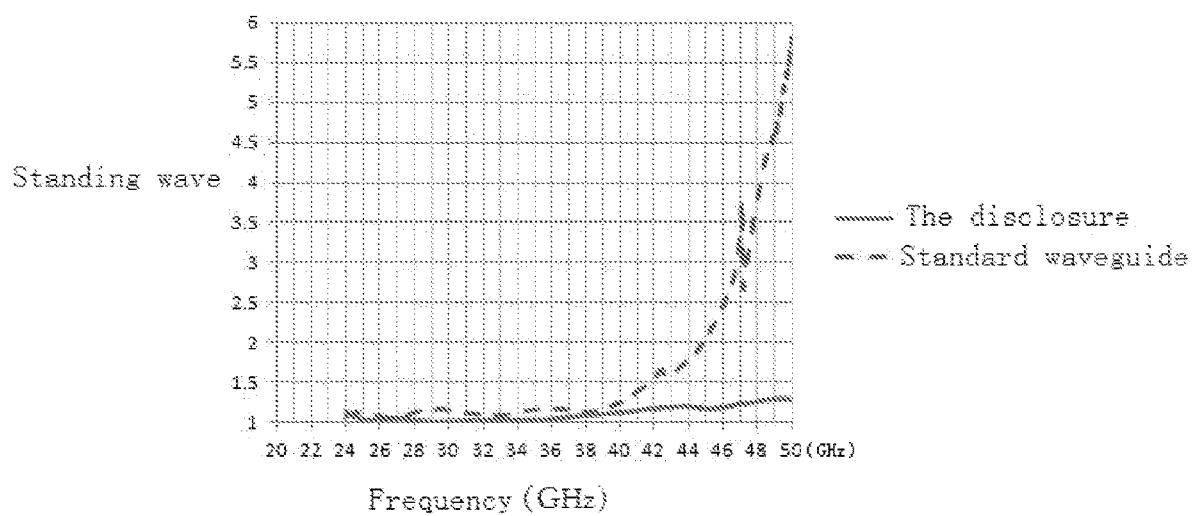
FIG. 12 is a comparison diagram of standing wave curves in the disclosure and a standard waveguide.
Figure 13:
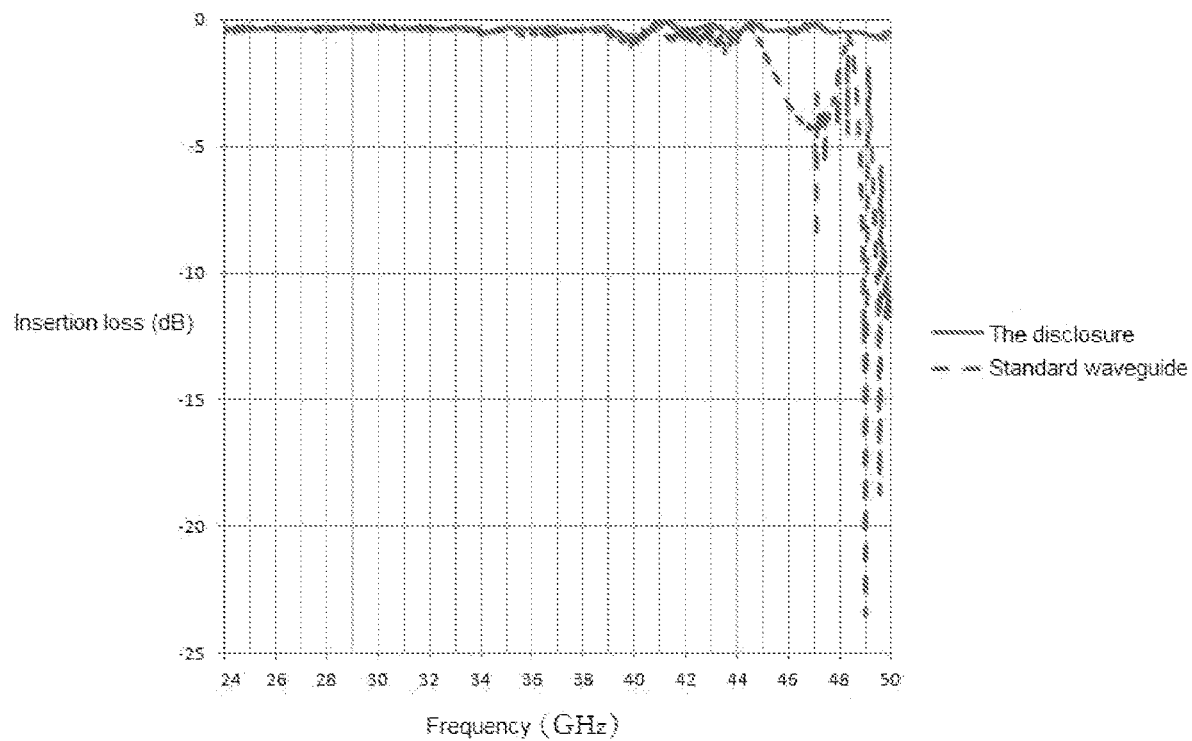
FIG. 13 is a comparison diagram of insertion loss curves in the disclosure and a standard waveguide.

FIG. 12 is a comparison diagram of standing wave curves in the disclosure and a standard waveguide. FIG. 13 is a comparison diagram of insertion loss curves in the disclosure and a standard waveguide. It can be seen from FIGS. 12 and 13 that a standing wave and insertion loss in the disclosure are lower and stabler.

According to the converter in the disclosure, impedance matching is implemented by the step structure, the operation bandwidth is expanded, and the step structure is easy to debug and simple to machine, with machining difficulty reduced. Moreover, the narrow b-edge structure (the shorter side of the rectangular waveguide is called the side b) is used at the joint between the waveguide and the coaxial structure (the narrow b-edge structure is realized by arranging slopes on the upper surface and the lower surface in the cavity) to further expand the high frequency bandwidth, such that easy machinability of the structure is ensured while the operation bandwidth is effectively widened.

In addition, since the cut-off frequency (the low frequency) of the fundamental mode of the rectangular waveguide is mainly affected by the size of the longer side, that is, the side the of the rectangular waveguide, reduction of the size of the side b (the shorter side of the rectangular waveguide) has little effect on the cut-off frequency of the fundamental mode of the waveguide. Moreover, the narrow b-edge structure is able to reduce the size of the aperture of the rectangular waveguide, change the length-width ratio of the rectangle, and improve the cut-off frequency (the high frequency) of the high-order mode to the certain extent, so as to expand the bandwidth.

The invention claimed is:

1. A terminated spread-spectrum waveguide-to-coaxial converter, comprising an upper cavity, a lower cavity, a cover plate and a connector, wherein a waveguide cavity is formed between the upper cavity and the lower cavity, openings are formed on a left side and a right side of the waveguide cavity, the cover plate is fixed to an outer side of a left end opening of the waveguide cavity, the connector is fixed to an outer side of the cover plate, and a coaxial inner conductor on the connector passes through a through hole formed on the cover plate to enter the waveguide cavity;
wherein a distance between the upper cavity and the lower cavity is gradually increased from left to right;
wherein a boss structure which is continuous is formed on a left side of an inner surface of the lower cavity, a sleeve is arranged at an end of the boss structure corresponding to the coaxial inner conductor, and an end of the coaxial inner conductor inserts into the sleeve;
wherein the boss structure comprises a first boss, a second boss and a third boss that are continuous and gradually rise from right to left in sequence, the sleeve is located on a left side face of the third boss, a groove is formed at a joint between the sleeve and the third boss, and the end of the coaxial inner conductor inserts into the sleeve, extends into the groove, and keeps a distance from a bottom of the groove.

2. The terminated spread-spectrum waveguide-to-coaxial converter according to claim 1, wherein an upper surface of the third boss keeps distance from a lower surface of the upper cavity.

3. The terminated spread-spectrum waveguide-to-coaxial converter according to claim 1, wherein a gap is formed between the coaxial inner conductor and the through hole of the cover plate.

4. The terminated spread-spectrum waveguide-to-coaxial converter according to claim 1, wherein a slope extending upwards is formed from a middle of a lower surface of the upper cavity to a right end opening of the waveguide cavity, and a slope extending downwards is formed from a middle of an upper surface of the lower cavity to the right end opening of the waveguide cavity.

5. The terminated spread-spectrum waveguide-to-coaxial converter according to claim 1, wherein an upper flange connecting portion is formed on a right side of the upper cavity, a lower flange connecting portion is formed on a right side of the lower cavity, the upper flange connecting portion and the lower flange connecting portion form a flange connecting portion, and a connecting hole is formed on the flange connecting portion.

6. The terminated spread-spectrum waveguide-to-coaxial converter according to claim 1, wherein the upper cavity and the lower cavity are fixedly connected to each other by a screw and a screw hole that match each other.

7. The terminated spread-spectrum waveguide-to-coaxial converter according to claim 1, wherein the cover plate is fixed to left ends of the upper cavity and the lower cavity by screws, and the connector is fixed to the cover plate by screws.

8. A terminated spread-spectrum waveguide-to-coaxial converter, comprising an upper cavity, a lower cavity, a cover plate and a connector, wherein a waveguide cavity is formed between the upper cavity and the lower cavity, openings are formed on a left side and a right side of the waveguide cavity, the cover plate is fixed to an outer side of a left end opening of the waveguide cavity, the connector is fixed to an outer side of the cover plate, and a coaxial inner conductor on the connector passes through a through hole formed on the cover plate to enter the waveguide cavity;
wherein a boss structure which is continuous is formed on a left side of an inner surface of the lower cavity, a sleeve is arranged at an end of the boss structure corresponding to the coaxial inner conductor, and an end of the coaxial inner conductor inserts into the sleeve;
wherein the boss structure comprises a first boss, a second boss and a third boss that are continuous and gradually rise from right to left in sequence, the sleeve is located on a left side face of the third boss, a groove is formed at a joint between the sleeve and the third boss, and the end of the coaxial inner conductor inserts into the sleeve, extends into the groove, and keeps a distance from a bottom of the groove.

* * * * *